US010031828B2

(12) United States Patent
Rodriguez et al.

(10) Patent No.: US 10,031,828 B2
(45) Date of Patent: *Jul. 24, 2018

(54) OPTIMIZATION OF POWER AND COMPUTATIONAL DENSITY OF A DATA CENTER

(71) Applicant: eBay Inc., San Jose, CA (US)

(72) Inventors: Jeremy Rodriguez, Sunnyvale, CA (US); Richard Henry Donaldson, II, San Francisco, CA (US); Dean Harold Nelson, Saratoga, CA (US); Serena Anne De Vito, San Mateo, CA (US); Braden Carter, Soquel, CA (US); Christopher Narancic, Queen Creek, AZ (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/845,856

(22) Filed: Dec. 18, 2017

(65) Prior Publication Data

US 2018/0107578 A1 Apr. 19, 2018

Related U.S. Application Data

(63) Continuation of application No. 14/472,918, filed on Aug. 29, 2014, now Pat. No. 9,870,297.

(51) Int. Cl.
*G06F 11/30* (2006.01)
*G06F 11/34* (2006.01)
(Continued)

(52) U.S. Cl.
CPC ........ *G06F 11/3428* (2013.01); *G05B 13/024* (2013.01); *G06F 11/3006* (2013.01);
(Continued)

(58) Field of Classification Search
CPC .. G06F 2212/1028; G06F 3/0625; G11C 5/04
See application file for complete search history.

(56) References Cited

U.S. PATENT DOCUMENTS

| 6,366,889 B1 * | 4/2002 | Zaloom | G06Q 10/04 705/400 |
| 9,870,297 B2 * | 1/2018 | Rodriguez | G06F 11/3428 |

(Continued)

OTHER PUBLICATIONS

Non-Final Office Action received for U.S. Appl. No. 14/472,918, dated Mar. 9, 2017, 7 pages.
(Continued)

*Primary Examiner* — Elias Desta
(74) *Attorney, Agent, or Firm* — Schwegman Lundberg & Woessner, P.A.

(57) ABSTRACT

Techniques for optimizing power and computational density of data centers are described. According to various embodiments, a benchmark test is performed by a computer data center system. Thereafter, transaction information and power consumption information associated with the performance of the benchmark test are accessed. A service efficiency metric value is then generated based on the transaction information and the power consumption information, the service efficiency metric value indicating a number of transactions executed via the computer data center system during a specific time period per unit of power consumed in executing the transactions during the specific time period. The generated service efficiency metric value is then compared to a target threshold value. Thereafter, a performance summary report indicating the generated service efficiency metric value, and indicating a result of the comparison of the generated service efficiency metric value to the target value, is generated.

20 Claims, 10 Drawing Sheets

(51) Int. Cl.
*G05B 13/02* (2006.01)
*G06Q 10/10* (2012.01)

(52) U.S. Cl.
CPC ......... *G06F 11/3062* (2013.01); *G06Q 10/10* (2013.01); *G06F 2201/81* (2013.01); *G06F 2201/87* (2013.01); *Y02B 70/16* (2013.01)

(56) References Cited

U.S. PATENT DOCUMENTS

| | | | | |
|---|---|---|---|---|
| 2015/0312116 | A1* | 10/2015 | Taheri | H04L 67/10 709/224 |
| 2015/0378762 | A1* | 12/2015 | Saladi | H04L 41/0816 718/1 |
| 2016/0062867 | A1 | 3/2016 | Rodriguez et al. | |

OTHER PUBLICATIONS

Response to Non-Final Office Action filed on Jun. 9, 2017, for U.S. Appl. No. 14/472,918, dated Mar. 9, 2017, 16 pages.
Applicant Initiated Interview Summary received for U.S. Appl. No. 14/472,918, dated Jun. 28, 2017, 2 pages.
Notice of Allowance received for U.S. Appl. No. 14/472,918, dated Sep. 13, 2017, 8 pages.

* cited by examiner

|  | No. of Transactions | Power consumed (watts) | Energy consumed (kWh) | No. of Users | Revenue ($) | Cost ($) | Carbon generated |
|---|---|---|---|---|---|---|---|
| Search Queries | Data Centers A, G, I | 351 Million | 9.8 Megawatts | ⋮ | ⋮ | ⋮ | ⋮ |
| Seller Listings | Data Centers B, C, E | 8.3 Million | 1.2 Megawatts | ⋮ | ⋮ | ⋮ | ⋮ |
| Purchases | Data Centers D, F | 5.7 Million | 2.2 Megawatts | ⋮ | ⋮ | ⋮ | ⋮ |
| TOTAL |  | 366 Million | 13.4 Megawatts |  |  |  |  |

*Fig. 6*

OPTIMIZATION OF POWER AND COMPUTATIONAL DENSITY OF A DATA CENTER

PRIORITY

This application is a continuation of and claims the benefit of priority to U.S. patent application Ser. No. 14/472,918, now U.S. Pat. No. 9,870,297, entitled "OPTIMIZATION OF POWER AND COMPUTATIONAL DENSITY OF A DATA CENTER," filed on Aug. 29, 2014, which is hereby incorporated by reference herein in its entirety.

TECHNICAL FIELD

The present application relates generally to data processing systems and, in one specific example, to techniques for optimizing power and computational density of data centers.

BACKGROUND

Many businesses such as, for example, search engine websites, e-commerce websites, marketplace websites, etc.) rely on data centers that process large amounts of data. Data centers typically include many server computers and other devices that consume power. Data center power consumption is currently on the rise and is expected to continue growing rapidly, particularly due to the popularity of mobile devices and the millions of users connecting to the Internet.

BRIEF DESCRIPTION OF THE DRAWINGS

Some embodiments are illustrated by way of example and not limitation in the figures of the accompanying drawings in which:

FIG. 6 illustrates an exemplary data structure containing various operations information received and managed by a data management module, according to various embodiments;

DETAILED DESCRIPTION

Figure 1:
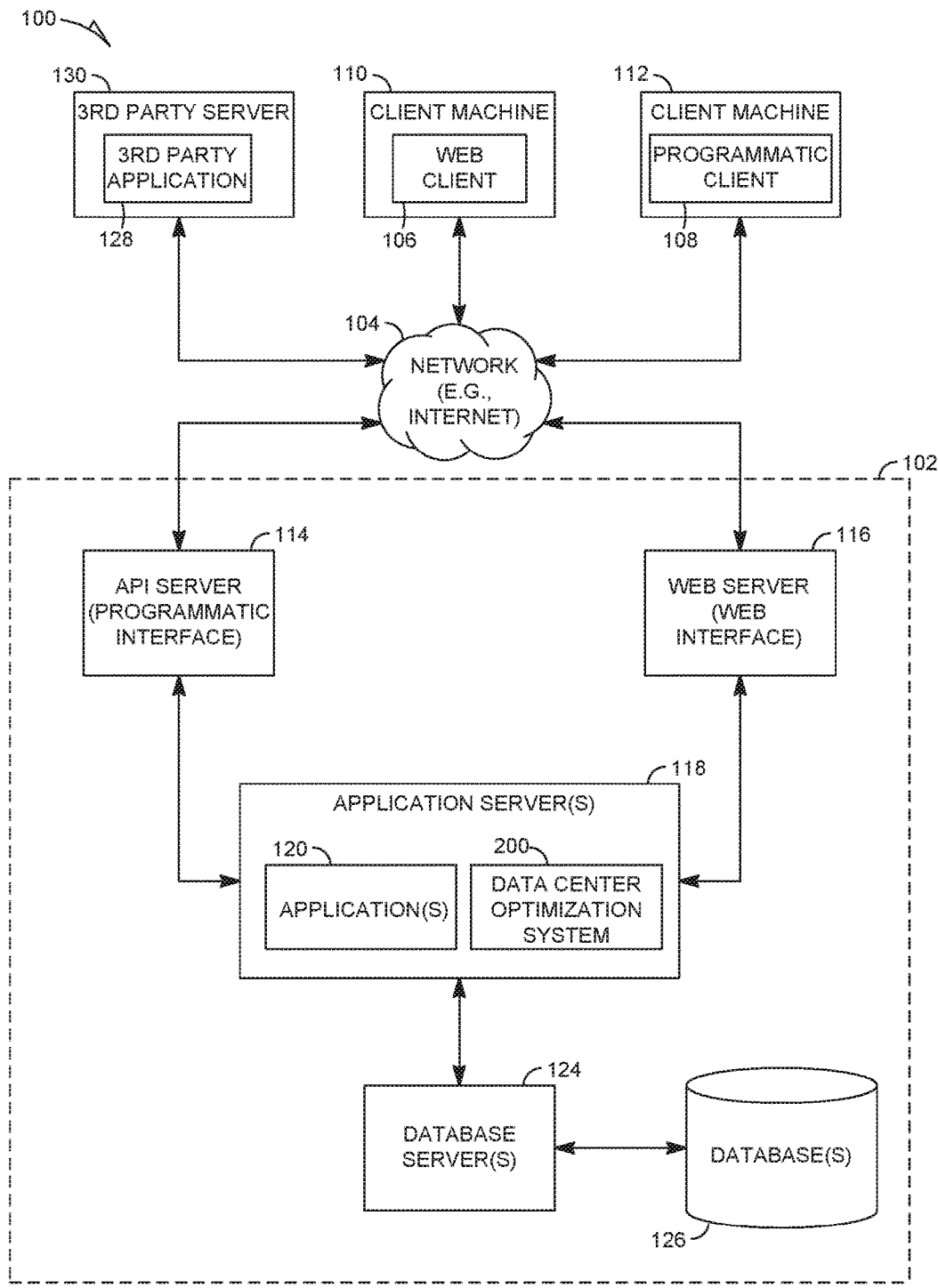
FIG. 1 is a network diagram depicting a client-server system, within which one example embodiment may be deployed.

Example methods and systems for optimizing power and computational density of data centers are described. In the following description, for purposes of explanation, numerous specific details are set forth in order to provide a thorough understanding of example embodiments. It will be evident, however, to one skilled in the art that the present invention may be practiced without these specific details.

According to various embodiments, a benchmark test is performed by a computer data center system. Thereafter, transaction information and power consumption information associated with the performance of the benchmark test by the computer data center system is then accessed. A service efficiency metric value is then generated based on the transaction information and the power consumption information, the service efficiency metric value indicating a number of transactions executed via the computer data center system during a specific time period per unit of power consumed in executing the transactions during the specific time period. The generated service efficiency metric value is then compared to a target threshold value. Thereafter, a performance summary report indicating the generated service efficiency metric value, and indicating a result of the comparison of the generated service efficiency metric value to the target value, is generated.

Various embodiments may be applied in the context of a benchmarking phase of a data center optimization process described herein for identifying and selecting data center components. The data center optimization process described here may be utilized to select the components of one or more data center servers and associated rack configurations, and to evaluate the environments that they operate in, in order to optimize server footprint and computational density. More specifically, there is described herein a technique to optimize technology portfolios, by identifying a combination of hardware commodities and server solutions that are tested for multiple environments, operations systems, and application environments. Moreover, year-over-year performance analysis may be generated that can substantiate the cost optimization of each component. Such a data center optimization process may enable an enterprise to remove hundreds of different systems designed for different types of workloads within an enterprise environment, and design a single server platform that is optimized for all of these workloads. Such a data center optimization process will now be described.

In a first step of the overall data center optimization process, desired server requirements are gathered from customers, where such requirements may be expressed in terms of the capability, price, and performance of various data center components. Examples of such server requirements include: how many cores does the customer desire in each processor, how much random access memory (RAM) does the customer think they will need, what kind of disk speed/size does the customer think their application will need, and so on.

In a second step of the overall data center optimization process, the customer requirements are analyzed and different candidate components that meet the customer's performance, price targets, and other requirements, are identified. This process may involve communication with various commodity and Original Equipment Manufacturer (OEM) vendors, such as the manufacturers of server processors, hard drives, storage components, memory components, and so on.

In a third step of the overall data center optimization process, benchmarks may be obtained from customers and elsewhere for the purposes of validating and optimizing the candidate components of the data center servers. Benchmarks may include generic, industry standard benchmarks, as well as application-specific benchmarks that customers have provided based on applications they foresee being deployed on the data center system. Thus, this benchmarking phase involves testing actual components with data, in order to identify an optimized data center configuration meeting the customer's requirements. At the conclusion of the benchmarking phase, components that are optimized may be identified, and a server configuration that is close to the final bill of materials (BOM) may be identified. During the benchmarking testing, inefficiencies in either the hardware that is targeted for use, or inefficiencies in how the software uses the hardware, may be identified. The benchmarking process may also involve determining, for each customer, what is the fewest number of server configurations (also referred to herein as server SKUs or stock keeping units) that are still optimized and cost effective. For example, each customer may be associated with a different profile, and as a result of the data center optimization techniques describe herein, each customer may be presented with a single server SKU that is cost optimized for each of them or even for all of them, as opposed to each of the customers buying several different types of SKUs.

In a fourth "proof of concept" step of the overall data center optimization process, a data center configuration that has been tested in the lab with benchmarks may be tested with actual production-based software. In other words, the final components may be deployed in the data center in order to ensure that all the previous calculations and estimates are validated in true production conditions. At this fourth step, the candidate system may be operated for a certain period of time (e.g., a month), and minor adjustments may be performed as necessary in order to optimize performance.

In a fifth step of the overall data center optimization process, a Total Cost of Ownership (TCO) analysis may be performed in order to ensure that the system does not exceed customer cost requirements. The final resulting server configuration may then be treated as a plan of record. Follow up steps may be performed, such as planning the timing and other details involving the switch over from one server BOM (e.g. current generation server BOM) to the next generation server BOM.

Notwithstanding the data optimization techniques described herein, each customer previously performed their own server selection process, ordering their own servers, and typically selecting something that is not optimized. In the process, customers were paying premium prices both for the server components themselves and also for the data center space they consume. Using the data center optimization techniques described herein, a large number of servers may be deployed for customers at a time, where these servers are all preconfigured in a single server design solution in large quantities to meet their business needs.

As described above, a benchmarking phase of a data optimization process may involve utilizing industry standard generic benchmarks to evaluate multiple hardware solutions to understand the optimum configuration for a customer. As described herein, a benchmark is the act of running a computer program, a set of programs, or other operations, in order to assess the relative performance of an object, normally by running a number of standard tests and trials against it. Thus, a benchmark typically exercises the hardware components in the server system and acts as a simulation of potential workloads. Examples of benchmarks include Standard Performance Evaluation Corporation (SPEC) benchmarks well known by those skilled in the art that may be performed to evaluate a processor, a storage system, how fast hard drives and disks operate, memory systems (e.g., RAM), the clock rate of the memory, the latency of the memory (how fast the memory can execute with a processor), and so on. Thus, a benchmark is a program to measure the capacity of a given set of materials by running a representative workload of some feature that is being measured, and doing so in a consistent way by using either captured data or manufactured set of data (so that rerunning the test at a different time should yield the same result).

Accordingly, by utilizing benchmarks, different candidate hardware sets and components may be evaluated collectively, and the power usage of the hardware components together may be understood, as well as environmental factors like inlet temperature and total airflow (e.g., across all components, because if it is in a super hot environment performance may degrade). Standard generic benchmarks include the SPEC benchmarks that may be applied as described herein to hyper scale use cases to understand generational performance. Thereafter, customer-specific benchmarks (e.g., based on a search workload of a online search engine) may be utilized to evaluate the actual application performance of the candidate systems to see if it is consistent with targets as well as to identify potential optimization. In some embodiments, different benchmarks may be associated with different types of customer workloads. For example, for a search environment, the "SPEC power" benchmark (such as "SPECpower_ssj2008") evaluates the power and performance characteristics of volume server class computers, and correlates very highly with the search-type software workload. On the other hand, for an online financial transaction environment, the "SPEC int" benchmark (for testing CPU integer processing power) may be utilized as it to correlates highly to that type of workload.

According to various embodiments described herein, various service efficiency metrics may be generated based on the results of a benchmarking test or based otherwise on some aspect of the performance of a system that is performing a benchmarking test. As described herein, a service efficiency metric may generally be defined as an analytical measurement intended to quantify a state or a characteristic of a system. For example, a benchmarking test may involve processing actual or sample queries (such as a search queries received via a search engine), actual or sample postings of listings (such as seller listings associated with an online marketplace), actual or sample online financial transactions (such as online purchase orders associated with an online marketplace). Such testing may be also be performed at processor performance levels, such as at 10% performance, 20% performance, etc. As described in more detail below, a service efficiency metric such as queries (e.g., search queries) per second per watt at each processor performance level may be calculated, in order to ensure that the processor is achieving the targets and is consistent generation-over-generation. Thus, queries per second per watt may be a valuable indicator, because the queries per second of a second generation system might be much improved versus a prior generation, but the queries per second per watt metric may indicate that the second generation system is consuming double the energy versus the prior generation, and may thus indicate that the second generation system is not optimized.

In some embodiments, a performance summary may be generated during the benchmarking phase that highlights service efficiency metrics (such as "queries per second per watt" consumed by a data center system) in order to understand the performance increases and associated power consumption changes associated with a candidate server configuration, and also to compare that to metrics of a prior generation of the system that also been benchmarked in the same way. Thus, year-over-year results showing the net improvement of server configurations may be obtained. Such performance summaries may be generated even for minor changes in data center components, such as the inclusion of more processor cores or additional memory, in order to understand whether the performance is increasing or decreasing and whether all system resources and hardware components are actually optimized for use with the underlying workloads. In contrast, previous solutions did not include a consolidated process to look at the performance of the system and how it may respond year-over-year.

FIG. 1 is a network diagram depicting a client-server system 100, within which one example embodiment may be deployed. A networked system 102 provides server-side functionality via a network 104 (e.g., the Internet or Wide Area. Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more applications 120. The application servers 118 are, in turn, shown to be coupled to one or more databases servers 124 that facilitate access to one or more databases 126. According to various example embodiments, the applications 120 may be implemented on or executed by one or more of the modules of the data center optimization system 200 illustrated in FIG. 2. While the applications 120 are shown in FIG. 1 to form part of the networked system 102, it will be appreciated that, in alternative embodiments, the applications 120 may form part of a service that is separate and distinct from the networked system 102. With some embodiments, the application servers 118 hosts what is referred to herein as a data center optimization system 200. The data center optimization system 200 is described in more detail below in conjunction with FIG. 2.

Further, while the system 100 shown in FIG. 1 employs a client-server architecture, the present invention is of course not limited to such an architecture, and could equally well find application in a distributed, or peer-to-peer, architecture system, for example. The various applications 120 could also be implemented as standalone software programs, which do not necessarily have networking capabilities.

The web client 106 accesses the various applications 120 via the web interface supported by the web server 116. Similarly, the programmatic client 108 accesses the various services and functions provided by the applications 120 via the programmatic interface provided by the API server 114.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more functions that are supported by the relevant applications of the networked system 102.

Figure 2:
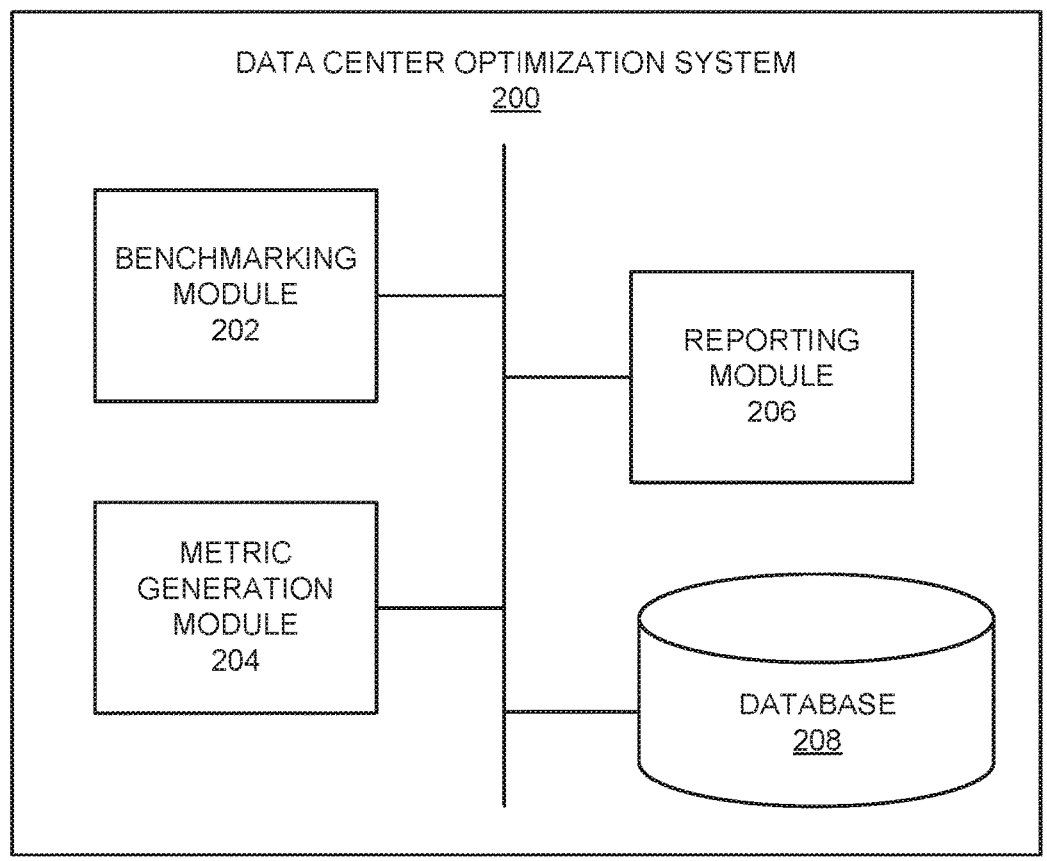
FIG. 2 is a block diagram of an example system, according to various embodiments.

Turning now to FIG. 2, a data center optimization system 200 includes a benchmarking module 202, a metric generation module 204, a reporting module 206, and a database 208. The modules of the data center optimization system 200 may be implemented on or executed by a single device such as a data center optimization device, or on separate devices interconnected via a network. The aforementioned data center optimization device may be, for example, one of the client machines (e.g. 110, 112) or application server(s) 118 illustrated in FIG. 1. The operation of each of the aforementioned modules of the data center optimization system 200 will now be described in greater detail in conjunction with FIG. 3.

Figure 3:
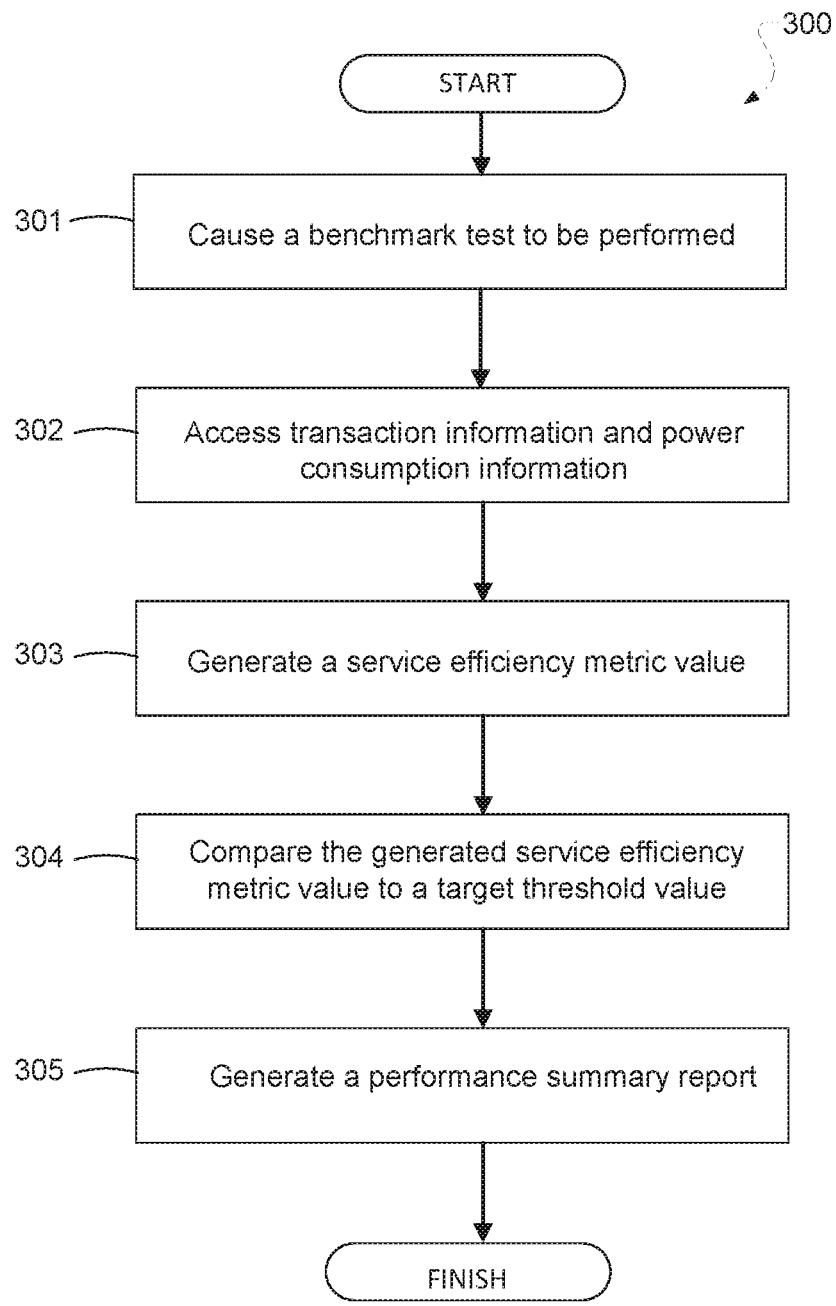
FIG. 3 is a flowchart illustrating an example method, according to various embodiments.

FIG. 3 is a flowchart illustrating an example method 300, according to various example embodiments. The method 300 may be performed at least in part by, for example, the data center optimization system 200 illustrated in FIG. 2 (or an apparatus having similar modules, such as client machines 110 and 112 or application server 118 illustrated in FIG. 1). In operation 301 in FIG. 3, the benchmarking module 202 causes causing a benchmark test to be performed by on one or more components of a computer data center system (e.g., by transmitting an instruction to the relevant components of the data center system to execute a computer program instructions associated with the benchmark test). In some embodiments, the benchmark test may be at least one of a Standard Performance Evaluation Corporation (SPEC) integer (or "SPECint") benchmark test, SPEC power benchmark test, a queries per second (QPS) benchmark test at one or more processor loads (e.g., 10% performance, 20% performance, 100% performance, etc.), a transactions per second (TPS) benchmark test at one or more processor loads, an integer processing power benchmark test, a latency benchmark test, a copy time and duration benchmark test, a load time and duration benchmark test, an unzip time and duration benchmark test, and so on. Moreover, the embodiments described herein are applicable to any computing benchmarking test known to those skilled in the art.

In operation 302 in FIG. 3, the metric generation module 204 accesses transaction information and power consumption information associated with the performance of the benchmark test by the computer data center system. In operation 303 in FIG. 3, the metric generation module 204 generates service efficiency metric; value which may be used to gauge the efficiency or optimization of the computer data center system. In some embodiments, the metric generation module 204 may generate the service efficiency metric value based on the transaction information and the power consumption information accessed in operation 302. The service efficiency metric value may indicate a number of transactions executed via the computer data center system during a specific time period (e.g., one second) per unit of power (e.g., watt) consumed in executing the transactions during the specific time period. For example, the transactions may correspond to search queries executed by the computer data center system while performing a benchmarking test, and the power consumed may correspond to a data center power consumption value observed at the computer data center system during the execution of the search queries. In such case, the metric generation module 204 may generate a service efficiency metric such as "queries per watt" or "queries per second per watt". As another example, the transactions may correspond to postings of seller listings by the computer data center system while performing a benchmarking test, and the power consumed may correspond to a data center power consumption value observed at the computer data center system during the postings of the seller listings. In such case, the metric generation module 204 may generate a service efficiency metric such as "listings per watt" or "listings per second per watt". As another example, the transactions may correspond to purchase transactions executed by the computer data center system while performing a benchmarking test, and the power consumed may correspond to a data center power consumption value observed at the computer data center system during the execution of the purchase transactions. In such case, the metric generation module 204 may generate a service efficiency metric such as "checkouts per watt" or "checkouts per second per watt". The generation of service efficiency metrics by the metric generation module 204 is described in greater detail below. The metric generation module 204 may instead or in addition generate any of the other service efficiency metrics described below.

In operation 304 in FIG. 3, the reporting module 206 compares the generated service efficiency metric value to a target threshold value. In some embodiments, the reporting module 206 calculates or generates the target threshold value, based on a prior service efficiency metric value associated with performance of the same benchmark test by another configuration (e.g., a prior configuration) of the computer data center system. For example, if the metric generation module 204 calculates a "queries per second per watt" value in operation 303, then the reporting module 206 may access a prior "queries per second per watt" value generated by the previous generation of the computer data center system while performing the same benchmarking test that was performed in operation 301. In some embodiments, the data center optimization system 200 may display a user interface allowing a user of the data center optimization system 200 to specify the target value of the appropriate service efficiency metric.

Figure 4:
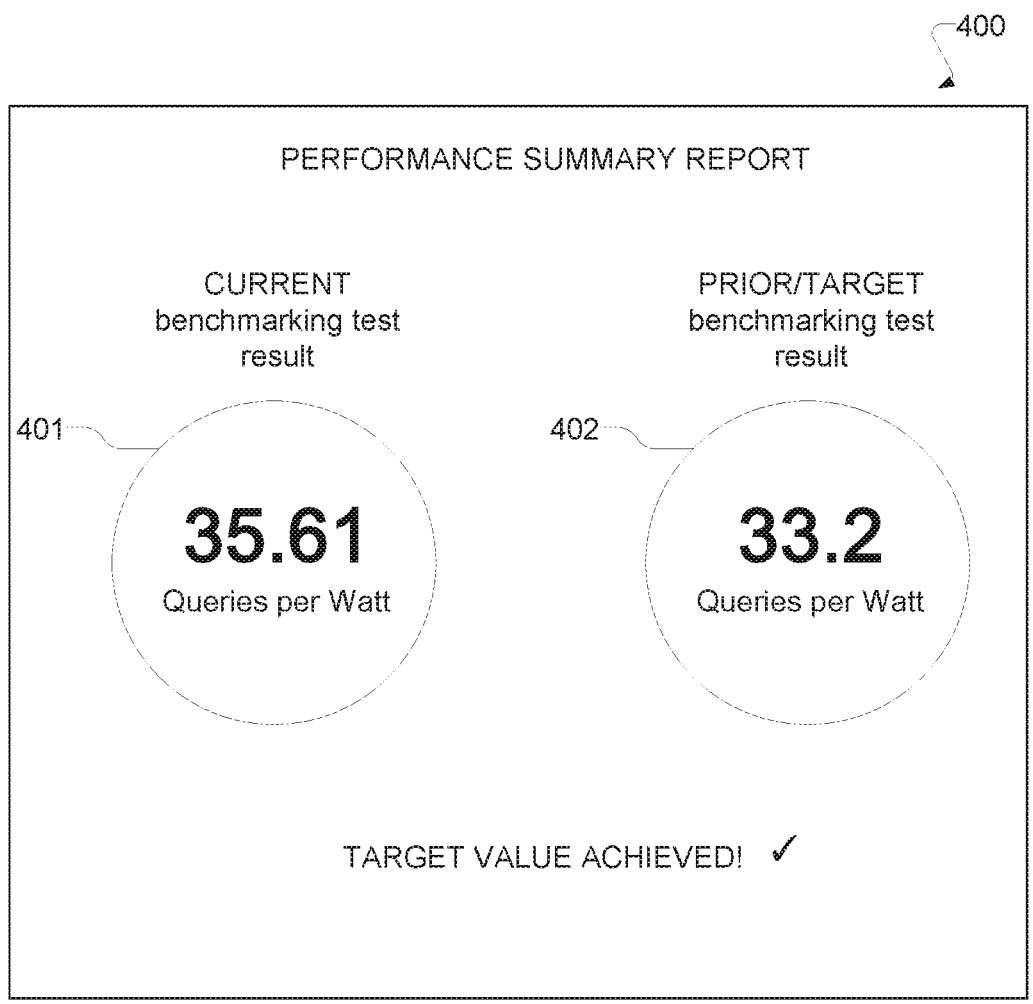
FIG. 4 is a flowchart illustrating an example performance summary report, according to various embodiments.

In operation 305 in FIG. 3, the reporting module 206 generates a performance summary report indicating the generated service efficiency metric value and indicating a result of the comparison of the generated service efficiency metric value to the target value. In some embodiments, the reporting module 206 may display the performance summary report to a user via a user interface (e.g., see FIG. 4).

In some embodiments, if the reporting module 206 determines that the generated service efficiency metric value is less than the target value, the reporting module 206 may display a notification, via a user interface, indicating that the computer data center system is not optimized. Alternatively, if the reporting module 206 determines that the generated service efficiency metric value is equal to or greater than the target value, the reporting module 206 may display a notification, via a user interface, indicating that the computer data center system is optimized. The notification may be included in the aforementioned performance summary report, or may be a standalone notification. In some embodiments, the notification may be included in any type of electronic message, including an e-mail, text message (e.g., a short messaging service (SMS) message, a multimedia messaging service (MMS) message, etc.), an instant message associated with an online social network (e.g., Facebook, LinkedIn, Wechat, WhatsApp, etc.), a chat message associated with an online chat service, and so on.

Example Service Efficiency Metrics

The metric generation module 204 of the data center optimization system 200 is configured to collect and manage various types of operations information pertaining to the operation of a computer data center system associated with an entity or online business. An example of an entity or online business is a website, a widget, or an application corresponding to a client application installed on a mobile device, such as a search engine website, an e-commerce website, a marketplace website, an app, a widget on a desktop or home screen, etc. Such online businesses may be hosted by one or more application servers (e.g., application server(s) 118 illustrated in FIG. 1) and/or web servers (e.g., web server 116 illustrated in FIG. 1). Such online businesses may be accessible through a network (e.g., the Internet) with use of a web browser application of a client device (e.g., client machine 110 or 112 in FIG. 1, which may correspond to a personal computer, a tablet, a smartphone, a mobile device, etc.), where the web browser application of the client device may access a specific Uniform Resource Locator (URL) reference link corresponding to the online business. Such aspects of a browser application that accesses web pages via a network are understood by those skilled in the art, and shall not be described further in the interests of brevity. While this disclosure refers throughout to an exemplary online business as an example of an entity that may utilize the data center optimization system 200 of this disclosure, it should be understood that the various aspects and embodiments of this disclosure are applicable to the generation of service efficiency metrics for all entities and/or businesses, including online and offline businesses, and to online businesses accessed through technologies other than a web browser.

As described in more detail below, the operations information is data collected or calculated by the metric generation module 204 that indicates some aspect relating to the activities of the online business or resources being consumed by the operation of the online business during a given time period (e.g., during performance of a benchmarking test), and may include: a number of transactions being executed at the online business in a given time period; the amount of power being consumed by the online business's data centers (e.g., server nodes, or the chassis of the servers) during a given time period; the amount of energy being consumed by the online business's data centers during a given time period; the number of users (unique or otherwise) of the online business during a given time period; a calculation result indicating the amount of carbon generated (or the amount of $CO_2$ generated or the amount of carbon emissions) due to the power consumption of the online business's data centers during a given time period; the cost incurred from operating the online business during a given time period; the revenue generated from operations of the online business during a given time period; and so forth. The given time periods described above (also referred to as "specific time periods" or "particular time periods" throughout) may occur during the performance of a benchmarking test, and may be default time periods or user-specified time periods (e.g., specified based on user input to the system 200). Examples of time periods include 1 second, 1 hour, 24 hours, 48 hours, 7 days, 1 month, etc.

Figure 5:
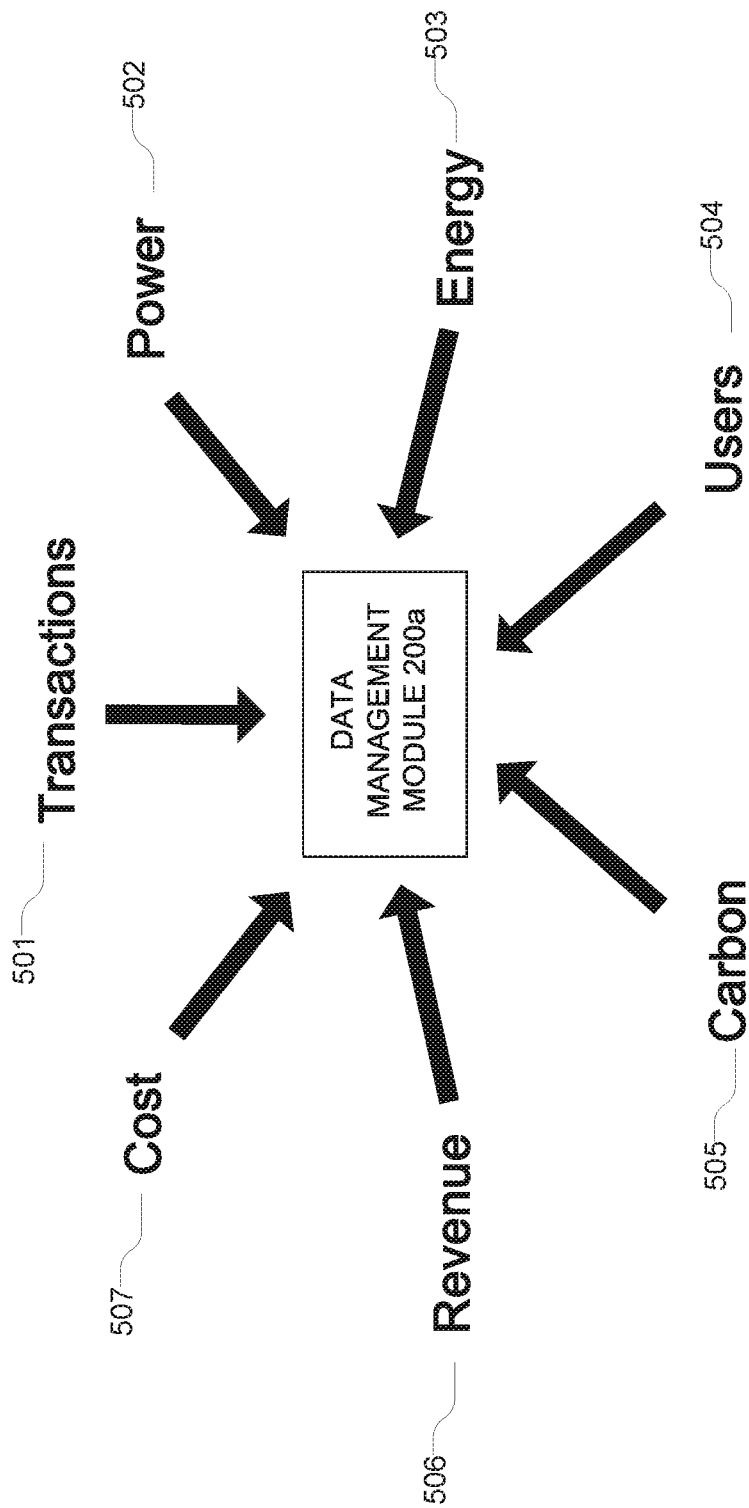
FIG. 5 illustrates various examples of operations information received and managed by a data management module, according to various embodiments.

FIG. 5 illustrates some of the types of observed or calculated operations information that may be collected and managed by the metric generation module 204. For example, the metric generation module 204 can receive: transaction information 501 indicating the number of transactions being executed at the online business in a give time period; power consumption information 502 indicating the amount of power being consumed by the online business's data centers during a given time period (where the amount of power consumed may be expressed in units of, for example, watts (W)); energy consumption information 503 indicating the amount of energy being consumed by the online business's data centers during a given time period (where the amount of energy consumed may be expressed in units of, for example, joules (J) or kilowatt-hours (kWh)); user count information 504 indicating the number of users (unique or otherwise) of the online business during a given time period;

carbon generation information 505 indicating the amount of carbon generated (or the amount of $CO_2$ generated or the amount of carbon emissions) due to the power consumption of the online business's data centers during a given time period (where the amount of carbon generated may be expressed in units of, for example, pounds, grams, metric tonnes, carbon dioxide equivalent (CDE), equivalent carbon dioxide ($CO_{2e}$), etc.); revenue information 506 indicating the revenue (e.g., in US$) generated from operations of the online business during a given time period; and cost information 507 indicating the cost (e.g., in US$) incurred from operating the online business during a given time period. The given time periods described above may occur during the performance of a benchmarking test.

As described above, the power consumption information 302 (indicating the amount of power being consumed by the online business's data centers during a given time period) may be expressed in units of, for example, watts (W), wherein the watt is the international standard unit of power. The power consumption information (as well as carbon/$CO_2$ consumption information) may be obtained from a businesses' utility power bill, which generally reflects the power consumption (as well as carbon/$CO_2$ consumption) of various aspects of a data center, including IT load, chiller load, transformer losses, lighting administration areas, and so forth. In some cases, utility power bills from a utility power provider may use kilowatt-hours (kWh) as the basis of quantity and cost, wherein kWh is a unit for representing energy rather than power. Accordingly, if the system 200 receives an energy consumption value in kWh, the system may convert this into a power consumption value by multiplying it by one thousand and then multiplying the result by the number of hours it was billed against. That is, kWh=unit of energy equivalent to 1000 Watts of power expended for one hour of time, and Watts=kWh×1000× (if monthly then the number of hours as billed for the month). The choice of generating a service efficiency metric based on either the energy consumption information (e.g., in kWh) or based on the power consumption information (e.g., in watts) used over the course of time may be made by each business entity, depending upon their needs and how granular they would like make the metric to be.

As described herein, the power consumption information may be generated by the system 200 based on power consumption statements from power utility companies. For example, if a specific data center handles a specific type of transaction (e.g., processing queries, posting seller listings, or executing purchase transactions), then the power consumption of that data center (e.g., as determined by the system 200 based on monthly power statements from power utility companies) may be associated with that specific type of transaction by the system 200. On the other hand, if a certain portion of servers in a data center handle a specific type of transaction, then the power consumption of that data center (e.g., as determined by the system 200 based on monthly power statements from power utility companies) may be associated with that specific type of transaction by the system 200. For example, if a third of the data servers in a data center execute query transactions, then a third of the power consumption of that data center may be associated by the system 200 with executing query transactions.

In some embodiments, if a particular data server handles a mix of transactions (e.g., queries, seller listings, and purchase transaction), then the power consumption information for that data server (which may be obtained by the system 200 by dividing the power consumption information for the corresponding data center by the number of servers in that data center) may be divided by the system 200 based on the mix of transactions being performed by that particular data server. For example, if a particular data server is handling an equal amount of query transactions and purchase transactions (as the system 200 may determine based on transaction/processing log reports generated by the data server), then half of the power consumption for that data server may be associated by the system 200 with query transactions and the other half of the power consumption information for that data server may be associated by the system 200 with purchase transactions.

If the given time period for which power consumption information is desired (e.g., during a corresponding to a benchmarking test) is less than the time interval of the power consumption information provided by the power utility company (e.g., less than a month), then the power consumption information provided by the power utility company may be divided by the system 200 based on the given time period to generate an estimate for the power consumption over the given time period. For example, if the relevant time period is one day in a month, then the monthly power consumption for that month may be divided by the system 200 by the number of days for that month. As another example, if the relevant period is one hour, then the monthly power consumption may be divided by the system 200 by the number of days for the month, and then divided by the system 200 by the number of hours in each day (24). As another example, if the relevant period is one minute, then the monthly power consumption may be divided by the system 200 by the number of days for the month, and then divided by the system 200 by the number of hours in each day (24), and then divided by the system 200 by the number of minutes in each hour (60). On the other hand, if the power utility companies provide power consumption information for more refined periods (e.g., the power used in a given week, day, hour, minute, etc.), then this data may be directly utilized by the system 200 for more refined results.

In some embodiments, cost (e.g., cost information 507) corresponds to the total dollar value of the facility power bill for the billing cycle. The other key value that can be derived from the utility power bill is the monetary cost for the power over the course of the billing cycle to support the data center. This allows the service value to be delineated in terms of the Operating Expenses to deliver the service. The techniques described above for calculating the power consumption associated with given time periods and associated with specific types of transactions (e.g., based on power consumption information in power bills from power utility companies) may be similarly applied by the system 200 to calculate the power costs associated with given time periods and associated with specific types of transactions (e.g., based on power cost information in power bills from power utility companies).

The carbon generation information 505 may be expressed using various units understood by those skilled in the art, such as pounds, grams, metric tonnes, carbon dioxide equivalent (CDH), equivalent carbon dioxide ($CO_{2e}$), and so forth. The amount of carbon generated is indirectly dependent on the amount of power consumed by the online business's data centers, since the production of power associated with the workload of the data centers generally requires power plants that burn substances such as coal, thereby producing the associated carbon.

As described herein, the system 200 may obtain power consumption information and other information (e.g., carbon/$CO_2$ consumption, monetary cost for power, etc.) from reports from power utility companies. For example, the system 200 may access a server or database associated with the power utility companies via a network in order to request and obtain the relevant information, or the system 200 may scan power consumption reports (e.g., received via email) from the power utility companies for the relevant information and extract the relevant information therefrom.

The metric generation module 204 may also collect a more specific subset of operations information, pertaining to the execution of specific types of services or transactions at data centers associated with an online business. For example, at the highest level, a marketplace website (such as eBay.com) may offer three primary services or transactions to their customers—Search, Sell, and Buy. Thus, specific types of services or transactions offered by a online business may include, for example, search transactions (such as search queries received from a user of the online business), seller listing transactions (such as when users of the online business post items for sale on the website of the online business), and purchase transactions or "purchases" (such as when users of the online business proceed to checkout or buy an item for sale on the website of the online business). This list of services or transactions is merely exemplary, and it should be understood that different businesses and online websites may, of course, be associated with other types of online and offline services or transactions (such as refunds, exchanges, queries, feedback, uploads, downloads, views, access events, updates, refreshes, etc.).

For each type of transaction executed at an online business, the metric generation module 204 may collect the various aforementioned types of operations information, as they pertain to the execution of that type of transaction at the online business, including: the number of that type of transaction being executed via the online business in a give time period; the amount of power being consumed by the online business's data centers in executing that type of transaction during a given time period; the amount of energy being consumed by the online business's data centers in executing that type of transaction during a given time period; the number of users (unique or otherwise) of the online business that are associated with that type of transaction during a given time period; the amount of carbon generated (or the amount of $CO_2$ generated or the amount of carbon emissions) due to the power consumption of the online business's data centers in executing that type of transaction during a given time period; the cost incurred in performing that type of transaction during a given time period, the revenue generated from that type of transaction during a given time period; and so forth. The given time periods described above may occur during the performance of a benchmarking test.

For example, FIG. 6 illustrates an example of a table 600 or similar data structure managed by the metric generation module 204. As illustrated in FIG. 6, the table 600 lists multiple types of online services or transactions that are executed at a particular online business, including search queries, seller listings, and purchase transactions. For each type of transaction, the table 600 lists the respective data centers (or particular service devices, computing devices, etc.) that are involved with the processing of those transactions, where this information may be detected automatically or specified via user input (e.g. the user input of an IT administrator of the online business).

Moreover, for each type of transaction, the table 600 lists various operations information including: the number of that type of transaction being executed via the corresponding data centers of the online business in a give time period; the amount of power being consumed by the corresponding data centers of the online business while executing that type of transaction during a given time period; the amount of energy being consumed by the corresponding data centers of the online business while executing that type of transaction during a given time period; the number of users (unique or otherwise) of the online business that are associated with that type of transaction during a given time period; the amount of carbon generated (or the amount of $CO_2$ generated or the amount of carbon emissions) due to the power consumption of the corresponding data centers of the online business while executing that type of transaction during a given time period; the operating cost incurred by the corresponding data centers of the online business while performing that type of transaction during a given time period; the online business's revenue generated from that type of transaction during a given time period; and so forth. The table 600 also lists the total amounts of each piece of operations information (e.g., number of transactions, power consumed, energy consumed, number of users, etc.) for all the types of transactions being executed at the online business. The given time periods described above may occur during the performance of a benchmarking test.

The metric generation module 204 may collect the various operations information described above from various sources, including via user input (e.g., from IT administrators and engineers associated with the online business). In the case of various type of operations information (such as number of transactions, number of users, amount of power consumed, etc.), the metric generation module 204 may be able to automatically collect this information from web servers and data centers connected to the system 200, as understood by those skilled in the art. Further, since the information in table 600 identifies which data centers perform each type of service/transaction (e.g. data centers A, G and I handle search query transactions), the power utility bill for those particular data centers (e.g. data centers A, G and I) may be used by the system 200 to determine the power consumption, energy consumption, operating cost and carbon generation for the corresponding transactions (e.g., search query transactions). The power consumption information for a particular set of data centers may be referred to as a "data center power consumption value". The metric generation module 204 may organize such information into a data structure, such as the data structure 600 illustrated in FIG. 6, where such as data structure may be stored at, for example the database 208.

Based on the various types of operations information collected and managed by the metric generation module 204, the metric generation module 204 is able to process the operations information in order to generate various types of service efficiency metrics. Such service efficiency metrics may provide a useful guide as to the efficiency of the online business, as described in more detail below.

According to various exemplary embodiments, the metric generation module 204 is configured to collect transaction information and power consumption information of data centers associated with an online business, and the metric generation module 204 is configured to generate a service efficiency metric referred to as "transactions per watt".

The transaction information is a piece of operations information that is collected by the metric generation module 204 and indicates a total number of transactions being executed at data centers associated with the online business, including transactions of various types such as search queries, seller listings/postings, and purchase transactions. For example, with reference to the operations information of table 600, the metric generation module 204 collects transaction information indicating that 366 million transactions have been executed at data centers associated with the online business in a given time period (e.g., one day). The power consumption information collected by the metric generation module 204 indicates an amount of power consumed by data centers associated with the online business while executing the aforementioned 366 million transactions (including transactions of various types such as search queries, seller listings/postings, and purchase transactions) in the given time period. For example, with reference to the operations information of table 400, the metric generation module 204 collects power consumption information indicating that 13.4 megawatts have been consumed by data centers associated with the online business while executing the aforementioned 366 million transactions in the given time period. The time periods described above may occur during the performance of a benchmarking test.

The metric generation module 204 is configured to generate a service efficiency metric based on the transaction information and power consumption information. In particular, the metric generation module 204 is configured to generate a service efficiency metric indicating a number of transactions executed at data centers associated with the online business during a specific time period (e.g., during performance of a benchmarking test), per unit of power consumed by operating the online business during the specific time period. For example, with reference to the operations information of table 600, the metric generation module 204 may divide the transaction information (366 Million transactions) by the power consumption information (e.g., 13.4 Megawatts) to generate a service efficiency metric of 27.29 transactions per watt. This indicates that, during the given time period, 27.29 transactions were performed for each watt of power consumed by the data centers.

While the service efficiency metric of transactions per watt described above was generated based on the total number of transactions of different types executed at the online business (e.g., during performance of a benchmarking test), the metric generation module 204 may calculate a service efficiency metric of transactions per watt for each type of transaction executed at the online business (e.g., during performance of a benchmarking test).

For example, the metric generation module 204 is configured to collect transaction information indicating a total number of a particular type of transaction (e.g., search queries) being executed at data centers associated with the online business (e.g., during performance of a benchmarking test). For example, with reference to the operations information of table 400, the metric generation module 204 collects transaction information indicating that 351 million search query transactions have been executed at data centers associated with the online business in a given time period (e.g., one day). The metric generation module 204 is also configured to collect power consumption information indicating an amount of power consumed by data centers associated with the online business while executing the aforementioned particular type of transaction (e.g., search queries) in the given time period. For example, with reference to the operations information of table 400, the metric generation module 204 collects power consumption information indicating that 9.8 megawatts have been consumed by data centers associated with the online business while executing the particular type of transaction (e.g., the aforementioned 351 million search queries) in the given time period (e.g., during performance of a benchmarking test).

Thereafter, the metric generation module 204 is configured to generate a service efficiency metric for each particular type of transaction (e.g., search queries), based on the transaction information and power consumption information for the particular type of transaction. That is, the metric generation module 204 is configured to generate a service efficiency metric indicating how many of the particular transactions have been executed at data centers associated with the online business during a specific time period (e.g., during performance of a benchmarking test), per unit of power consumed by the online business's data centers in executing those particular transactions during the specific time period. For example, with reference to the exemplary operations information of table 400, the metric generation module 204 may divide the transaction information (i.e., 351 million searches) by the power consumption information (i.e., 9.8 Megawatts) to generate a service efficiency metric of 35.61 transactions per watt for search query transactions (which may also be referred to as 35.61 searches per watt or queries per watt). This indicates that, during the given time period (e.g., during performance of a benchmarking test), 35.61 search query transactions were performed, for each watt of power consumed by the data centers in executing the search query transactions during the given time period. If the given time period is one second, then the aforementioned metric of "queries per watt" may also be referred to as "queries per second, per watt".

In a similar manner, the metric generation module 204 may generate a service efficiency metric of 6.77 transactions per watt for seller listing transactions (which may also be referred to as 6.77 listings per watt). This indicates that, during the given time period (e.g., during performance of a benchmarking test), 6.77 seller listing transactions were performed, for each watt of power consumed by the data centers in executing the seller listing transactions. And in a similar manner, the metric generation module 204 may generate a service efficiency metric of 2.49 transactions per watt for purchase/checkout transactions (which may also be referred to as 2.49 checkouts per watt). This indicates that, during the given time period (e.g., during performance of a benchmarking test), 2.49 purchase transactions were performed, for each watt of power consumed by the data centers in executing the purchase transactions.

Figure 7:
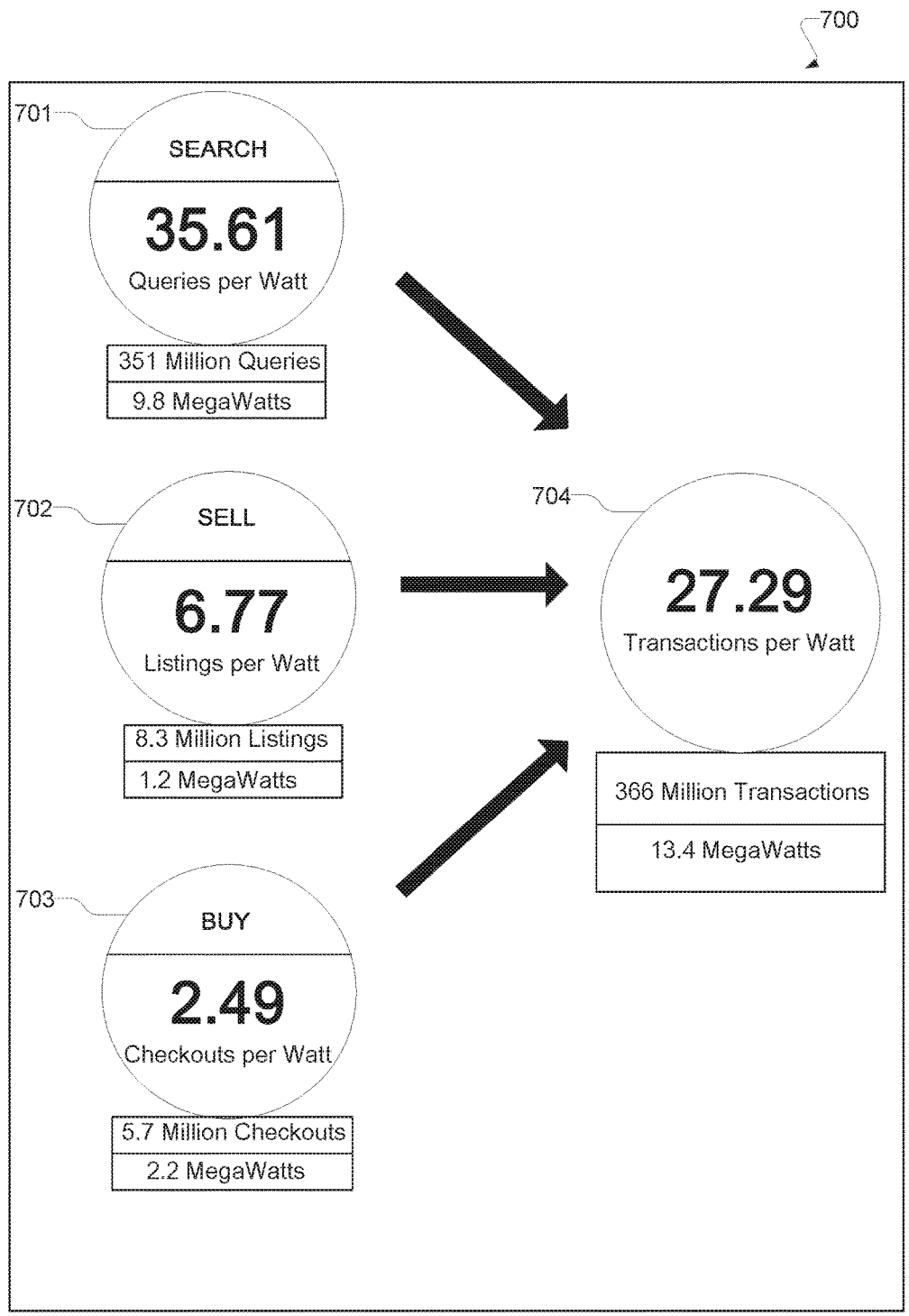
FIG. 7 illustrates an example portion of a user interface screen displayed by a system, according to various exemplary embodiments.

The metric generation module 204 may also display one or more generated service efficiency metrics on a display module connected to the data center optimization system 200. For example, FIG. 7 illustrates an example user interface screen 700 displayed on a display module (e.g., display screen or monitor) connected to the data center optimization system 200. User interface screen 700 displays various service efficiency metrics of "transactions per watt" generated by the metric generation module 204, based on the operations information in table 600.

The user interface 700 of FIG. 7 illustrates the user consumption of each type of service or transaction (including search queries, seller listings and purchase checkouts), and the corresponding wattage to deliver it over a 24-hour period. For example, area 701 of the user interface 700 illustrates that on a given day there were 351 million search queries performed by active users, and these searches required 9.8 Megawatts of power to be completed. Thus, the metric generation module 204 determines that on that day there was an average of 35.61 searches per watt. Similarly, area 702 of the user interface 700 illustrates that on a given day there were 8.3 million new listings (or new items for sale on marketplace website), and the posting of these listings required 1.2 Megawatts of power. Thus, the metric generation module 204 determines that there was an average of 6.77 listings per watt. Similarly, area 703 of the user interface 700 illustrates that on a given day there were 5.7 million checkouts or purchases, and the execution of these purchases required 2.2 Megawatts of power. Thus, the metric generation module 204 determines that there were 2.49 checkouts per watt in that 24-hour period.

To generate the total "transactions per watt", the metric generation module 204 may effectively combine each type of service/transaction (including search queries, seller listings, and purchases), and divide it by the total watts consumed. As illustrated in area 704 of the user interface 700, in that 24-hour period, the online business delivered 366 million transactions and consumed 13.4 Megawatts of power, effectively delivering 27.29 transactions per watt.

Thus, according to various exemplary embodiments, a data center optimization system generates one or more metrics that may be used to track various aspects of an entity or system. For example, the data center optimization system of this disclosure may generate a service efficiency metric of transactions per watt of electrical power. This metric tracks how efficiently online and offline businesses (such as marketplace websites) deliver core services to customers. In particular, the system 200 produces the "transactions per watt" metric based on how customers consume services of the business (actual user transactions) and the total amount of power to deliver those services (watts). An example of a transaction is an instance of transmitting data in response to a user interaction received via a network, such as: providing search results in response to a received query, providing an interface used to collect data from a user in response to a request, providing a confirmation message in response to receiving the collected data, and so forth. Thus, all changes in the infrastructure of the business (e.g., data center consolidation, technology refresh, code optimization, etc.) will either increase or decrease "transactions per watt", or the number of transactions performed per watt of power consumed by the data center.

For example, a marketplace website (such as eBay.com) may offer three primary services or transactions to their customers—Search, Buy, and Sell. Each of these services requires IT equipment (servers, storage, networking, etc.) and physical data center infrastructure. This infrastructure consumes wattage to complete each transaction from a user request. Thus, the system 200 generates the service efficiency metric "transactions per watt" that provides a methodology that simplifies the measurement of this user consumption. The higher the transactions in the "transactions per watt" service efficiency metric, the more efficiently the services are being delivered. In essence, the "transactions per watt" efficiency metric of a company's infrastructure may be treated as analogous to the "miles per gallon" efficiency metric for cars. Like cars, data centers have different designs, redundancy, and operational capabilities, and using the service efficiency metric of this disclosure, the efficiency of each of these elements may be measured by how many transactions may be performed (analogous to how many "miles" may be driven) for every watt of power (analogous to every "gallon of fuel") consumed by the data center.

Accordingly, during operations, the service efficiency metric generated by the system 200 may be used to help drive down costs and increase utilization of the services provided by an online business. For example, a business may set a target to baseline a "transactions per watt"—and corresponding "$ per watt" (described below)—to expose how efficiently the business is utilizing its infrastructure to deliver services for customers, and ultimately what that cost per watt is to deliver it. From there, the business may set targets to increase the transactions per watt, decrease the cost per watt, and so forth.

Figure 8:
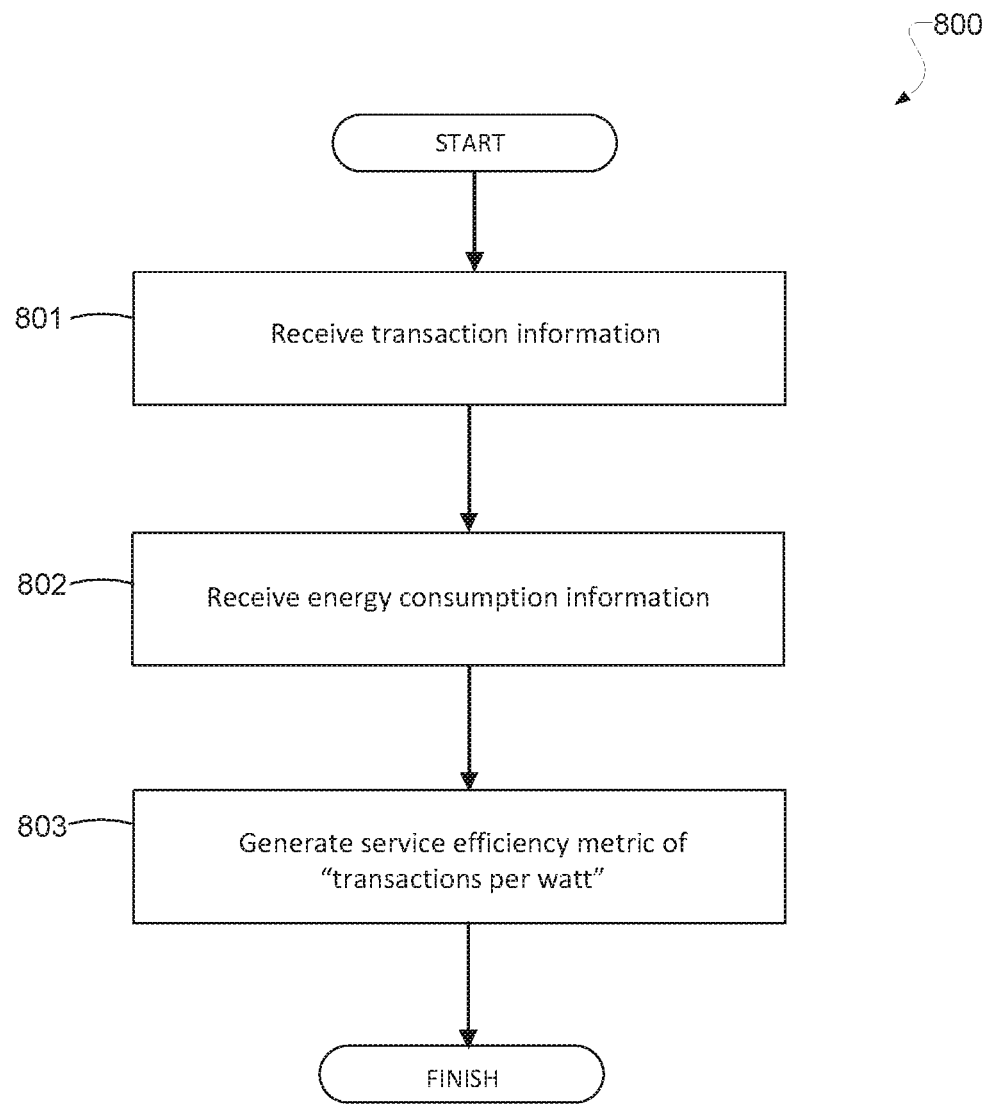
FIG. 8 is a flowchart illustrating an example method, according to various embodiments.

FIG. 8 is a flowchart illustrating an example method 800, according to various embodiments. The method 800 may be performed at least in part by, for example, the data center optimization system 200 illustrated in FIG. 2 (or a service efficiency management device having similar modules, such as client machines 110 and 112 or application server 112 illustrated in FIG. 1). In 801, the system receives transaction information, and in 802 the system receives power consumption information. In 803, the system generates a service efficiency metric of transactions per watt, based on the transaction information and power consumption information, the service efficiency metric of transactions per watt indicating a number of transactions executed via data centers associated with the online business during a specific time period (e.g., during performance of a benchmarking test), per unit of power consumed in executing the transactions during the specific time period.

According to various exemplary embodiments described below, the metric generation module is configured to generate other service efficiency metrics based on the other types of operations information. That is, the metric generation module 204 may receive at least two types of operations information, such as two of the various types of operations information illustrated in FIGS. 5 and 6, including: number of transactions, power consumption, energy consumption, number of users, cost, revenue, and carbon generated. Based on these two types of operations information, the metric generation module 204 may generate various types of service efficiency metrics.

More specifically, using the example of the operations information in table 600 of FIG. 6, for a given type of service/transaction (e.g., search queries, seller listing, purchases, all of the above), the metric generation module 204 may obtain a first operations value for the specific type of transaction (e.g. number of transactions, power consumption in executing the transactions, energy consumption in executing the transactions, number of users performing the transactions, revenue generated as a result of the transactions, cost of performing the transactions, and carbon generated in performing the transactions), and a second operations value for the specific type of transaction (e.g. number of transactions, power consumption in executing the transactions, energy consumption in executing the transactions, number of users performing the transactions, revenue generated as a result of the transactions, cost of performing the transactions, and carbon generated in performing the transactions). Thereafter, the metric generation module 204 may divide the first operations value by the second operations value, in order to generate service efficiency metric.

Examples of service efficiency metrics include performance-based service efficiency metrics that track and reflect performance, such as: Transactions per Watt (TpW), Transactions per User (TpU), and Watts per User (WpU). Other examples of service efficiency metrics include cost-based service efficiency metrics that track and reflect cost, such as Cost per Watt ($pW), Cost per User ($pU), Cost per Transaction ($pT). Other examples of service efficiency metrics include revenue-based service efficiency metrics that track and reflect revenue, such as Revenue per Watt (RpW), Revenue per Transaction (RpT), and Revenue per User (RpU). Other examples of service efficiency metrics include environmental-based service efficiency metrics that track and reflect environmental impact and/or carbon generation, such as Carbon per Watt (CpW), Carbon per Transaction (CpT), Carbon per User (CpU).

Other examples of service efficiency metrics include Transactions per Dollar Cost (Tp$), Transactions per Dollar Revenue (TpR), Transactions per Unit of Carbon generated (TpC), Transactions per Unit of Energy (TpE), Watts consumed per Transaction (WpT), Watts consumed per Dollar of Cost (Wp$), Watts consumed per Dollar of Revenue (TpR), Watts consumed per Unit of Carbon generated (TpC), Watts per Unit of Energy (WpE), Users per Transaction (UpT), Users per Watt consumed (UpW), Users per Dollar of Cost (Up$), Users per Dollar of Revenue (UpR), Users per Unit of Carbon generated (UpC), Users per Unit of Energy (UpE), Cost per Dollar of Revenue (CpR), Cost per Unit of Carbon generated ($pC), Cost per Unit of Energy ($pE), Revenue per Unit of Cost (Rp$), Revenue per Unit of Carbon generated (RpC), Revenue per Unit of Energy (RpE), Carbon generated per Dollar of Cost (Cp$), Carbon generated per Dollar of Revenue (CpR), Carbon per Unit of Energy (CpE), Energy per Transaction (EpT), Energy per Watt (EpW), Energy per user (EpU), Energy per Dollar of Cost (Ep$), Energy per Dollar of Revenue (EpR), Energy per Unit of Carbon generated (EpC).

As described above, each of the aforementioned metrics may be calculated based only on specific types of service/transactions being executed at data centers associated with an online business (e.g., during performance of a benchmarking test), or based on some combination or all the transactions being executed at data centers associated with the online business (e.g., during performance of a benchmarking test).

In some embodiments, the metric generation module 204 may generate a service efficiency metric of "transactions per user". For example, the metric generation module 204 receives transaction information and user count information, and the metric generation module 204 generates a service efficiency metric of transactions per user, based on the transaction information and the user count information, the service efficiency metric of transactions per user indicating a number of transactions executed via data centers associated with the online business during a specific time period (e.g., during performance of a benchmarking test), per user of the online business during the specific time period.

In some embodiments, the metric generation module 204 may generate a service efficiency metric of "watts per user". For example, the metric generation module 204 receives power consumption information and user count information, and the metric generation module 204 generates a service efficiency metric of watts per user, based on the power consumption information and user count information, the service efficiency metric of watts per user indicating an amount of power consumed by operations of data centers associated with the online business during a specific time period (e.g., during performance of a benchmarking test), per user of the online business during the specific time period.

In some embodiments, the metric generation module 204 may generate a service efficiency metric of "cost per transaction", "cost per watt", or "cost per user". For example, the metric generation module 204 receives transaction information, power consumption information, user count information, and operating cost information, and the metric generation module 204 generates a service efficiency metric of cost per transaction, based on the operating cost information and transaction information, the service efficiency metric of cost per transaction indicating a cost in operating data centers associated with the online business during a specific time period (e.g., during performance of a benchmarking test), per transaction executed at data centers associated with the online business during the specific time period. The metric generation module 204 may generate a service efficiency metric of cost per watt, based on the operating cost information and power consumption information, the service efficiency metric of cost per watt indicating a cost in operating data centers associated with the online business during a specific time period (e.g., during performance of a benchmarking test), per unit of power consumed in operating data centers associated with the online business during the specific time period. The metric generation module 204 may generate a service efficiency metric of cost per user, based on the operating cost information and user count information, the service efficiency metric of cost per user indicating a cost in operating data centers associated with the online business during a specific time period (e.g., during performance of a benchmarking test), per user of the online business during the specific time period.

In some embodiments, the metric generation module 204 may generate a service efficiency metric of "revenue per transaction", "revenue per watt", or "revenue per user". For example, the metric generation module 204 receives transaction information, power consumption information, user count information, and revenue information. The metric generation module 204 generates a service efficiency metric of revenue per transaction, based on the revenue information and transaction information, the service efficiency metric of revenue per transaction indicating revenue in operating the online business during a specific time period (e.g., during performance of a benchmarking test), per transaction executed at data centers associated with the online business during the specific time period. The metric generation module 204 generates a service efficiency metric of revenue per watt, based on the revenue information and power consumption information, the service efficiency metric of revenue per watt indicating revenue in operating the online business during a specific time period (e.g., during performance of a benchmarking test), per unit of power consumed in operating data centers associated with the online business during the specific time period. The metric generation module 204 generates a service efficiency metric of revenue per user, based on the revenue information and user count information, the service efficiency metric of revenue per user indicating revenue in operating the online business during a specific time period (e.g., during performance of a benchmarking test), per user of the online business during the specific time period.

In some embodiments, the metric generation module 204 may generate a service efficiency metric of "carbon per transaction", "carbon per watt", or "carbon per user". For example, the metric generation module 204 receives transaction information, power consumption information, user count information, and carbon generation information. The metric generation module 204 generates a service efficiency metric of carbon per transaction, based on the carbon generation information and transaction information, the service efficiency metric of carbon per transaction indicating an amount of carbon generated due to power consumption of the online business's data centers during a specific time period (e.g., during performance of a benchmarking test), per transaction executed at data centers associated with the online business during the specific time period. The metric generation module 204 generates a service efficiency metric of carbon per watt, based on the carbon generation information and power consumption information, the service efficiency metric of carbon per watt indicating an amount of carbon generated due to power consumption of the online business's data centers during a specific time period (e.g., during performance of a benchmarking test), per unit of power consumed in operating data centers associated with the online business during the specific time period. The metric generation module 204 generates a service efficiency metric of carbon per user, based on the carbon generation information and user count information, the service efficiency metric of carbon per user indicating an amount of carbon generated due to power consumption of the online business's data centers during a specific time period (e.g., during performance of a benchmarking test), per user of the online business during the specific time period.

According to various exemplary embodiments, the metric generation module 204 is also configured to analyze one of the service efficiency metrics described in this disclosure (e.g., transactions per watt), in order to output a recommendation for improving the service efficiency metric. For example, if the metric generation module detects that the given service efficiency metric drops below a predetermined threshold (which may be inputted by a user of the system 200), the metric generation module 204 may output a recommendation to improve a value of the service efficiency metric. For example, the recommendation may be: consolidating plural data center operations associated with the online business; replacing specific equipment associated with the online business; or optimizing a piece of software code associated with the online business.

Example Mobile Device

Figure 9:
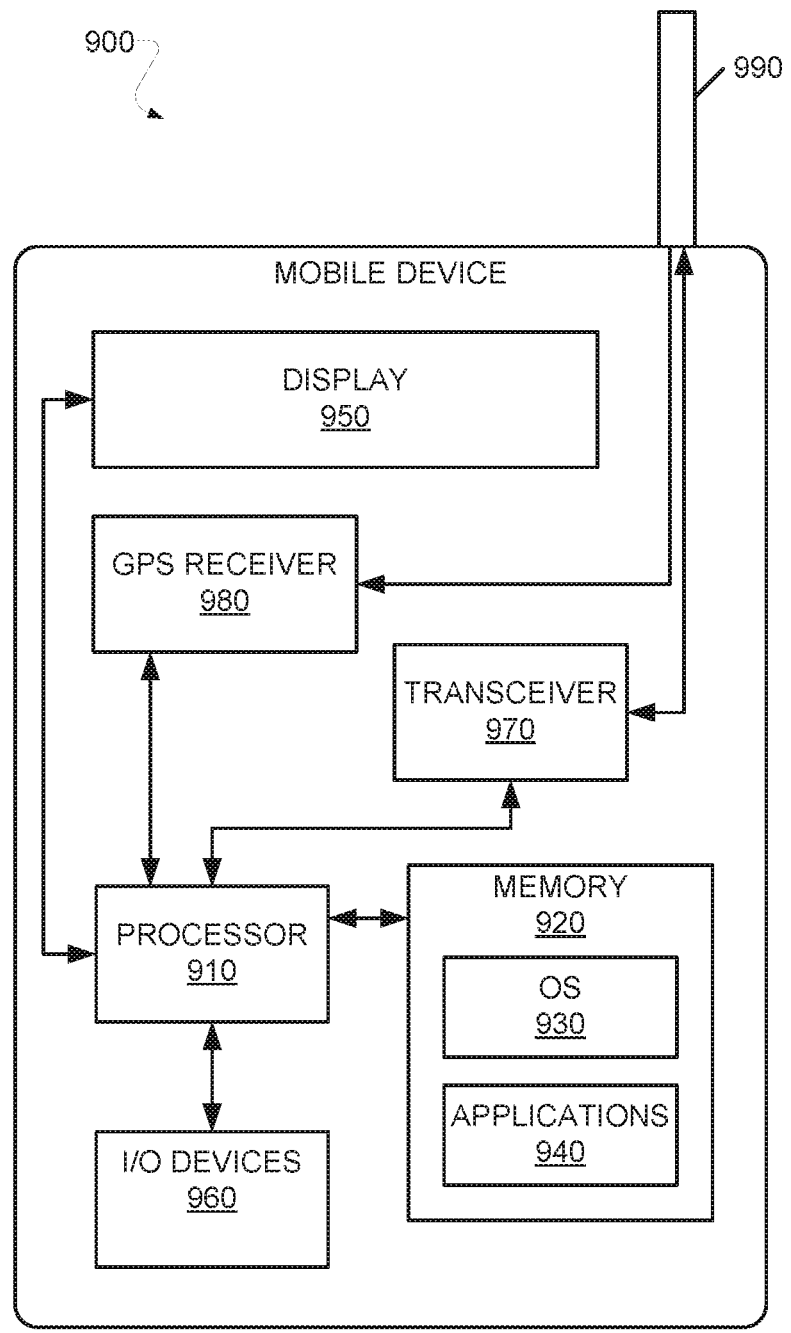
FIG. 9 illustrates an example mobile device, according to various embodiments.

FIG. 9 is a block diagram illustrating the mobile device 900, according to an example embodiment. The mobile device may correspond to, for example, one or more client machines or application servers. One or more of the modules of the system 200 illustrated in FIG. 2 may be implemented on or executed by the mobile device 900. The mobile device 900 may include a processor 910. The processor 910 may be any of a variety of different types of commercially available processors suitable for mobile devices (for example, an XScale architecture microprocessor, a Microprocessor without Interlocked Pipeline Stages (MIPS) architecture processor, or another type of processor). A memory 920, such as a Random Access Memory (RAM), a Flash memory, or other type of memory, is typically accessible to the processor 910. The memory 920 may be adapted to store an operating system (OS) 930, as well as application programs 940, such as a mobile location enabled application that may provide location based services to a user. The processor 910 may be coupled, either directly or via appropriate intermediary hardware, to a display 950 and to one or more input/output (I/O) devices 960, such as a keypad, a touch panel sensor, a microphone, and the like. Similarly, in some embodiments, the processor 910 may be coupled to a transceiver 970 that interfaces with an antenna 990. The transceiver 970 may be configured to both transmit and receive cellular network signals, wireless data signals, or other types of signals via the antenna 990, depending on the nature of the mobile device 900. Further, in some configurations, a GPS receiver 980 may also make use of the antenna 990 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (AMC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
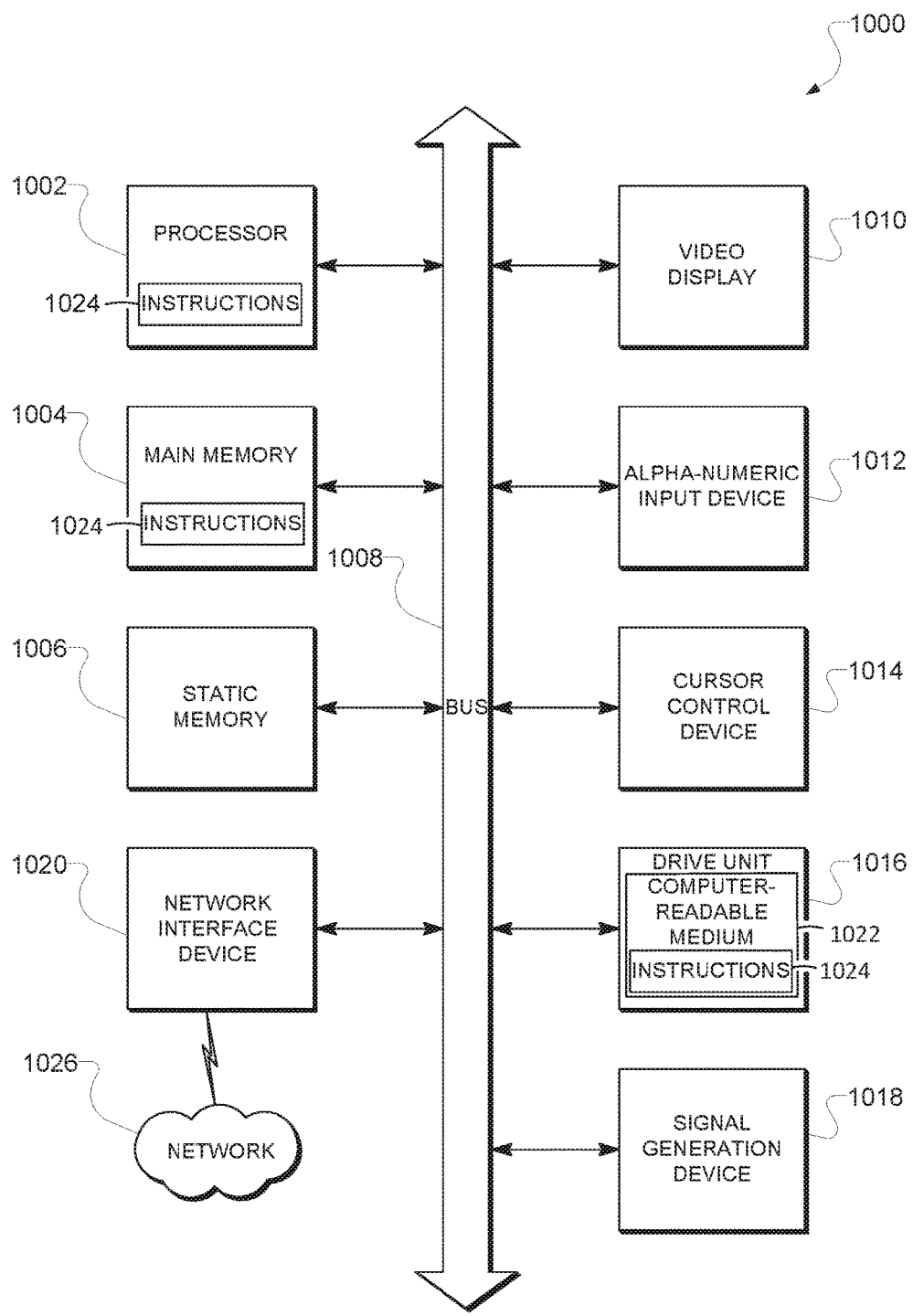
FIG. 10 is a diagrammatic representation of a machine in the example form of a computer system within which a set of instructions, for causing the machine to perform any one or more of the methodologies discussed herein, may be executed.

FIG. 10 is a block diagram of machine in the example form of a computer system 1000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media.

While the machine-readable medium 1022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   accessing transaction information and power consumption information associated with transaction execution by a computer data center system;
   generating, using one or more hardware processors, a service efficiency metric value based on the transaction information and the power consumption information, the service efficiency metric value indicating an efficiency of the computer data center system during a specific time period; and
   creating a server system using a combination of one or more processing components and one or more memory components, a configuration of the server system being defined to increase the service efficiency metric value.

2. The method of claim 1, wherein the service efficiency metric value is based on a performance of a benchmark test by the computer data center system.

3. The method of claim 1, wherein the transaction information is one or more of a number of transactions being executed, an amount of power being consumed, a number of users, a calculation result indicating an amount of carbon generated due to the transaction execution, a cost incurred from operating the computer data center system, and revenue generated.

4. The method of claim 1, wherein the service efficiency metric value is transactions per watt, transactions per user, watts per user, cost per watt, cost per user, cost per transaction, revenue per watt, revenue per transaction, revenue per user, carbon per watt, carbon per transaction, carbon per user, transactions per dollar cost, transactions per dollar revenue, transactions per unit of carbon generated, transactions per unit of energy, watts consumed per transaction, watts consumed per dollar of cost, watts consumed per dollar of revenue, watts consumed per unit of carbon generated, watts per unit of energy, users per transaction, users per watt consumed, users per dollar of cost, users per dollar of revenue, users per unit of carbon generated, users per unit of energy, cost per dollar of revenue, cost per unit of carbon generated, cost per unit of energy, revenue per unit of cost, revenue per unit of carbon generated, revenue per unit of energy, carbon generated per dollar of cost, carbon generated per dollar of revenue, carbon per unit of energy, energy per transaction, energy per watt, energy per user, energy per dollar of cost, energy per dollar of revenue, and energy per unit of carbon generated.

5. The method of claim 1, further comprising:
   generating a target threshold value based on a prior service efficiency metric value associated with a performance of a benchmark test by another configuration of the computer data center system.

6. The method of claim 5, further comprising:
   determining that the generated service efficiency metric value is less than the target threshold value; and
   displaying a notification, via a user interface, indicating that the computer data center system is not optimized.

7. The method of claim 1, wherein transactions include search queries executed by the computer data center system, and power consumed includes a data center power consumption value observed at the computer data center system during the execution of the search queries.

8. The method of claim 1, wherein transactions include postings of seller listings by the computer data center system, and power consumed includes a data center power consumption value observed at the computer data center system during the postings of the seller listings.

9. The method of claim 1, wherein transactions include purchase transactions executed by the computer data center system, and power consumed includes a data center power consumption value observed at the computer data center system during the execution of the purchase transactions.

10. The method of claim 1, wherein the specific time period is one second, and wherein a unit of power is watts.

11. The method of claim 1, further comprising:
    comparing the generated service efficiency metric value to a target threshold value;
    generating a performance summary report indicating the generated service efficiency metric value and indicating a result of the comparison of the generated service efficiency metric value to the target threshold value; and displaying the performance summary report to a user via a user interface.

12. The method of claim 2, wherein the benchmark test is at least one of a search query execution benchmark test, a processor integer benchmark test, a power efficiency benchmark test, and a memory performance benchmark test.

13. A system for processing a plurality of feedback items, the system comprising:
    one or more hardware processors and a memory to store instructions that, when executed by the one or more hardware processors causes the one or more hardware processors to perform operations comprising:
    accessing transaction information and power consumption information associated with transaction execution by a computer data center system;
    generating, using one or more hardware processors, a service efficiency metric value based on the transaction information and the power consumption information, the service efficiency metric value indicating an efficiency of the computer data center system during a specific time period; and
    creating a server system using a combination of one or more processing components and one or more memory components, a configuration of the server system being defined to increase the service efficiency metric value.

14. The system of claim 13, the operations further comprising:
    generating a target threshold value based on a prior service efficiency metric value associated with a performance of a benchmark test by another configuration of the computer data center system.

15. The system of claim 14, the operations further comprising:
    determining that the generated service efficiency metric value is less than the target threshold value; and
    displaying a notification, via a user interface, indicating that the computer data center system is not optimized.

16. The system of claim 13, wherein transactions include search queries executed by the computer data center system, and power consumed includes a data center power consumption value observed at the computer data center system during the execution of the search queries.

17. The system of claim 13, wherein transactions include postings of seller listings by the computer data center system, and power consumed includes a data center power consumption value observed at the computer data center system during the postings of the seller listings.

18. The system of claim 13, wherein transactions include purchase transactions executed by the computer data center system, and power consumed includes a data center power consumption value observed at the computer data center system during the execution of the purchase transactions.

19. The system of claim 13, the operations further comprising:
    comparing the generated service efficiency metric value to a target threshold value;
    generating a performance summary report indicating the generated service efficiency metric value and indicating a result of the comparison of the generated service efficiency metric value to the target threshold value; and
    displaying the performance summary report to a user via a user interface.

20. A non-transitory computer-readable medium embodying instructions that, when executed by one or more processors of a machine, cause the machine to perform operations comprising:
    accessing transaction information and power consumption information associated with transaction execution by a computer data center system;
    generating, using one or more hardware processors, a service efficiency metric value based on the transaction information and the power consumption information, the service efficiency metric value indicating an efficiency of the computer data center system during a specific time period; and
    creating a server system using a combination of one or more processing components and one or more memory components, a configuration of the server system being defined to increase the service efficiency metric value.

* * * * *